Aug. 8, 1939.   H. SIEB   2,169,114
BOOK GLUING MACHINE
Filed Aug. 31, 1938   13 Sheets-Sheet 1

Aug. 8, 1939.  H. SIEB  2,169,114
BOOK GLUING MACHINE
Filed Aug. 31, 1938   13 Sheets-Sheet 2

Inventor:
Henry Sieb,
by Wm. F. Freudenreich,
Atty.

Aug. 8, 1939.  H. SIEB  2,169,114
BOOK GLUING MACHINE
Filed Aug. 31, 1938    13 Sheets-Sheet 5

Inventor:
Henry Sieb,
by Wm. F. Freudenreich,
Atty.

Aug. 8, 1939. H. SIEB 2,169,114
BOOK GLUING MACHINE
Filed Aug. 31, 1938 13 Sheets-Sheet 7

Aug. 8, 1939.  H. SIEB  2,169,114
BOOK GLUING MACHINE
Filed Aug. 31, 1938  13 Sheets-Sheet 8

Aug. 8, 1939.    H. SIEB    2,169,114
BOOK GLUING MACHINE
Filed Aug. 31, 1938    13 Sheets-Sheet 10

Aug. 8, 1939.     H. SIEB     2,169,114
BOOK GLUING MACHINE
Filed Aug. 31, 1938     13 Sheets-Sheet 11

Aug. 8, 1939.  H. SIEB  2,169,114
BOOK GLUING MACHINE
Filed Aug. 31, 1938  13 Sheets-Sheet 12

Inventor:
Henry Sieb
by Wm. H. Freudenreich
Atty.

Aug. 8, 1939.  H. SIEB  2,169,114
BOOK GLUING MACHINE
Filed Aug. 31, 1938   13 Sheets-Sheet 13

Inventor:
Henry Sieb,
by Wm. F. Freudenreich,
Atty.

Patented Aug. 8, 1939

2,169,114

UNITED STATES PATENT OFFICE 2,169,114

BOOK GLUING MACHINE

Henry Sieb, Hammond, Ind.

Application August 31, 1938, Serial No. 227,695

17 Claims. (Cl. 91—13)

In the manufacture of sewn books, sheets are folded to produce groups of leaves known as sections, and the sections forming a complete book are then sewn together. In order that the back edge of a book shall be brought into and held in a flat state, with the rear edges of all of the sections touching a common plane, and the leaves be positioned at right angles to this plane, it is necessary to shake or jar it with its back edge against a flat surface and then to apply glue thereto; this glue penetrating the crevices between the various sections, and upon setting, producing a bond that holds the book in shape. The object of the present invention is to produce a machine which will satisfactorily do this work.

Specifically considered, the present invention may be said to have for its object automatically to operate upon books fed into the same, to jostle them in a manner to bring the leaves and the book sections into their true positions and, while maintaining this condition, applying glue in such a manner that the glue will be effectively worked into the crevices between sections, without penetrating too far and thus interfering with the proper opening of the books.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

In the drawings I have illustrated a machine provided with a long, narrow, horizontal bed or table 1 supported upon a suitable stationary frame structure 2. On top of the table or bed are two parallel guides 3 spaced apart from each other and extending from one end of the machine to the other; the guides being in the form of low hollow walls of considerable width provided on the sides directed toward each other with vertical faces; the ends of the guides being made flaring at what may be termed the inlet end of the machine, to permit books to be easily placed upon the table between the guides.

Books may be handled one at a time or in groups; the guides being so mounted that the distance between them may be varied over a considerable range.

Figure 9:
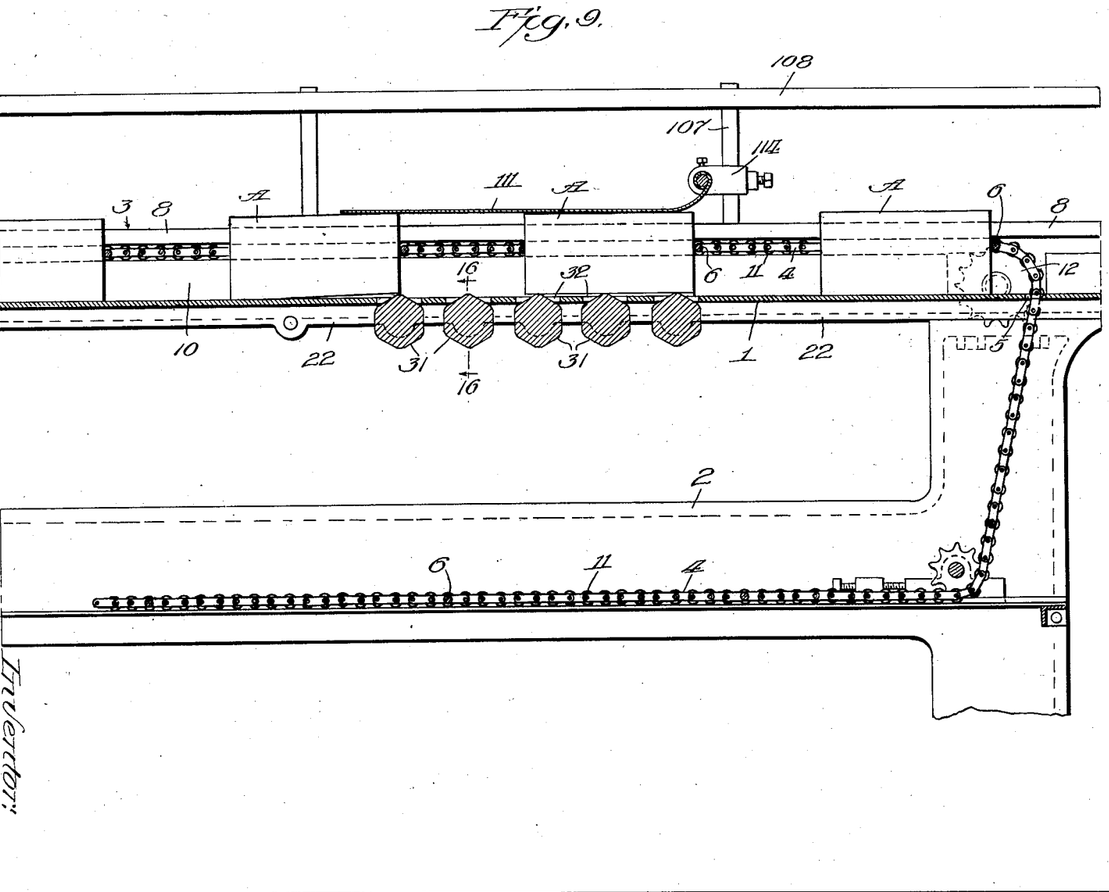
Fig. 9 is a vertical longitudinal central section through the end of the machine at which the hooks enter, namely the righthand end in Figs. 1 and 2.
Figure 10:
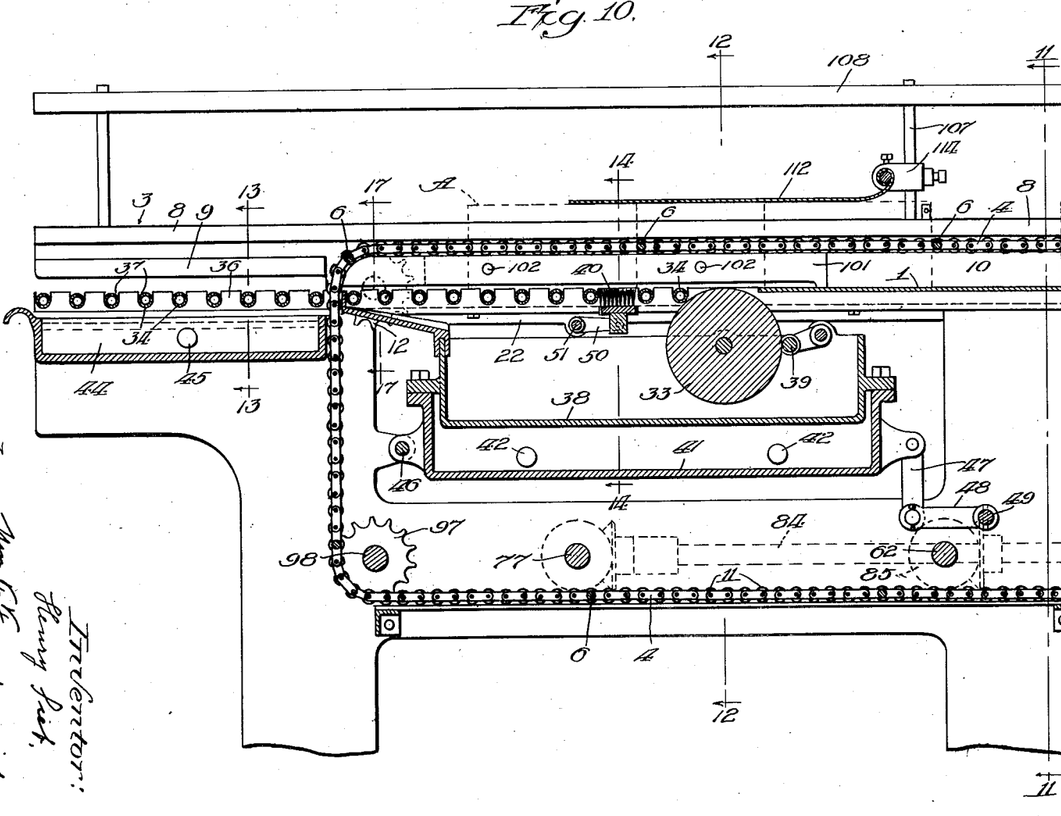
Fig. 10 is a view similar to Fig. 9, showing the opposite end of the machine.

After a book or a group of books arranged side by side is set upon the table at the inlet end of the machine, between the guides, it is carried automatically through the machine to the outlet end; this being accomplished by means of two endless drive chains 4, 4 arranged on opposite sides of the longitudinal center of the machine and lying in vertical planes; the upper horizontal run of each chain being above the table and the lower run being below the table. As shown in Fig. 9, each chain passes upwardly through a slot 5 close to the inlet end of the table and passes down below the table at the opposite end, as shown in Fig. 10, where the central portion of the table is cut away as will hereinafter be more fully explained. The two drive chains are connected together by parallel cross bars 6, spaced apart at any suitable intervals which are at least as great as the longest books that are to be glued, and preferably considerably greater than that. These bars should engage with the trailing end faces of the books a short distance above the table, so as not to tend to tilt the books or lift them from the table. Also, the chains should be supported so that all of the bars that happen to be above the table will lie at the same elevation, thereby avoiding any rubbing of the bars up and down on the book edges with which they engage.

Figure 6:
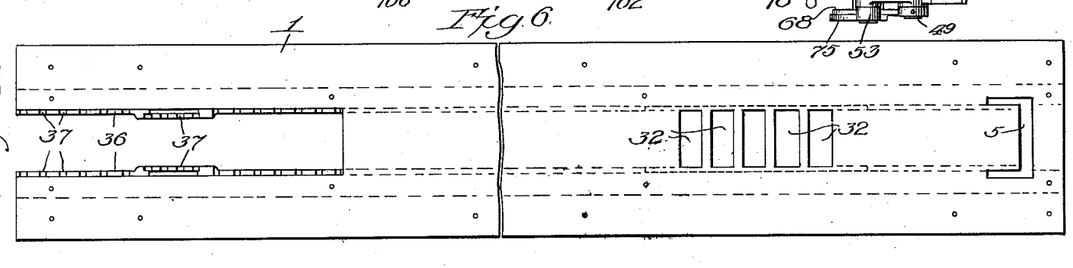
Fig. 6 is a top plan view of the top plate or table of the frame structure, that runs from one end of the machine to the other, a portion midway between the ends being omitted.
Figure 7:
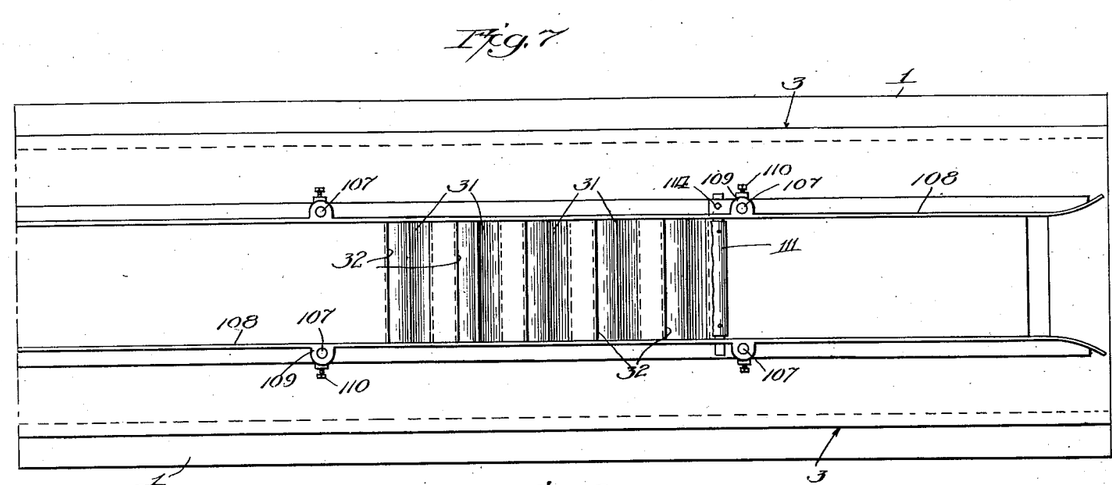
Fig. 7 is a top plan view, complementary to Fig. 5, and showing the righthand half of the machine as it appears in Fig. 1 with the driving apparatus omitted.
Figure 11:
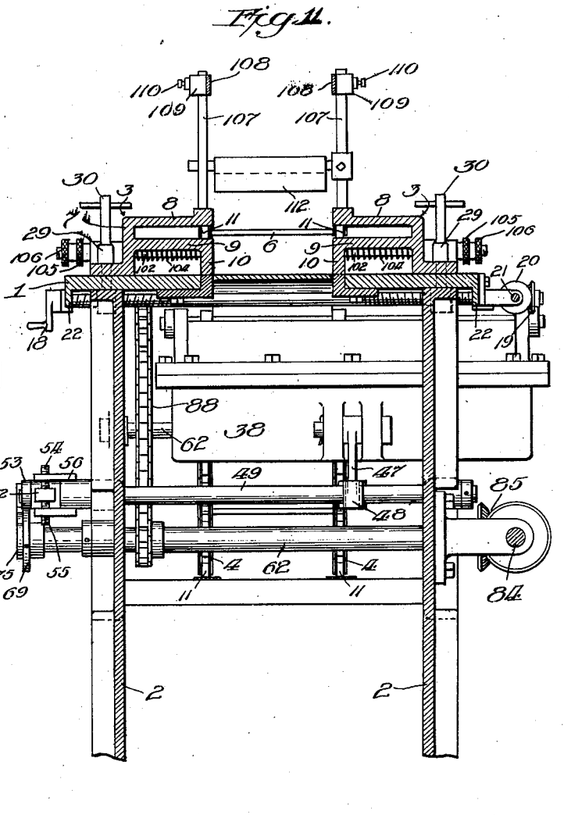
Figs. 11 and 12 are sections taken approximately on lines 11—11 and 12—12 of Fig. 10, showing the complete machine except that the lower portions of the supporting legs are omitted.
Figure 17:
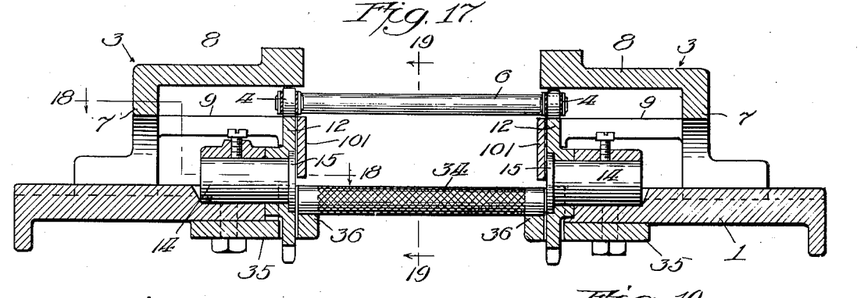
Fig. 17 is a section on line 17—17 of Fig. 10, the scale being as that of Figs. 13 and 14.
Figure 18:
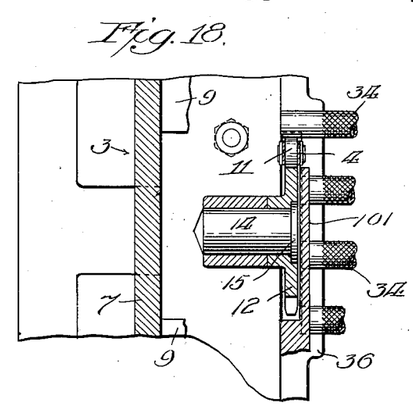
Fig. 18 is a section on line 18—18 of Fig. 17.
Figure 19:
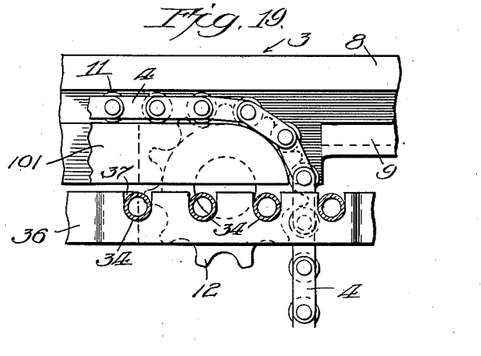
Fig. 19 is a section on line 19—19 of Fig. 17.

Since the guides 3 extend parallel with the upper runs of the chains, they may conveniently be utilized as rails for supporting those portions of the chains above the table. I have therefore so constructed the guides that they may serve equally well as supporting rails for the chains. As shown in Fig. 11, for example, each guide is formed of an elongated member 7, L-shaped in cross section, one flange of this member resting on the table and the other extending upright. Two horizontal flanges 8 and 9, spaced apart from each other, extend laterally from each of the members 7 toward the longitudinal center of the machine; the flanges 9 having at their inner edges depending flanges 10 which also rest upon the table to provide the guides or rails with wide bases. The upper runs of the sprocket chains extend into the space between the flanges 8 and 9, and rest on the latter flanges. Each chain is provided with a large number of rollers 11, as best shown in Fig. 19; there being preferably a roller surrounding each pin or pintle in the chain. Each chain runs over two sprocket wheels 12 located at opposite ends of the machine and extending partly above and partly below the table. The manner of supporting the sprocket wheels is best illustrated in Figs. 17, 18 and 19. In these figures there are shown the sprocket wheels at the delivery end of the machine. It will be seen that the table has a central longitudinal panel cut out of the same at this end, as best shown in Fig. 6. On opposite sides of this gap in the panel are stub shafts 14, fixed on top of the table with their axes horizontal and aligned. The sprocket wheels are loose on these stub shafts and are held thereon by heads 15 on the ends of the shafts. The flanges 9 and 10 of the guide rails are cut away in the vicinity of the sprocket wheels so that the guide rails overlie and house the sprocket wheels and their supporting shafts. The parts are so proportioned that when the guide rails are spread apart to the farthest limit, the sprocket chains lie close to the free edges of the flanges 9, as in Fig. 17. When the guide rails are moved toward each other, the sprocket wheels remain stationary and so do the chains; the chains simply retreating into the chambers or cavities between the flanges 8 and 9.

Figure 1:
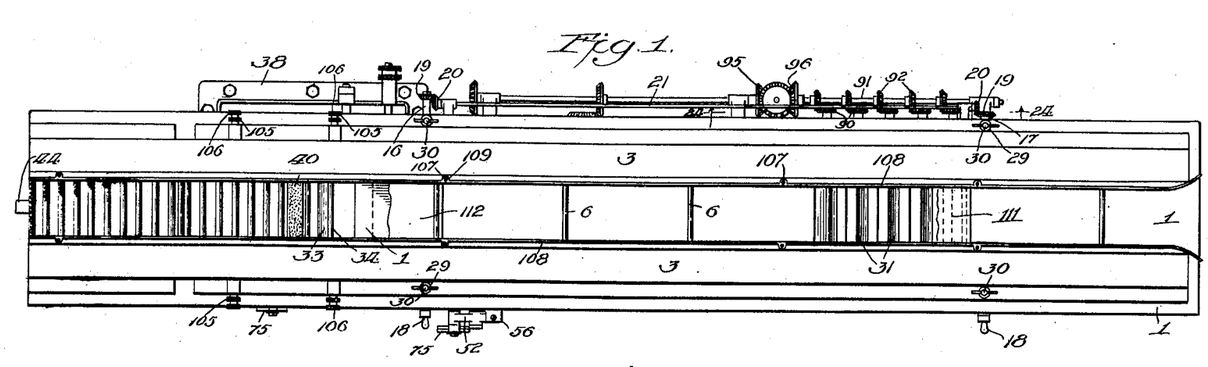
Figure 1 is a top plan view of a machine embodying the present invention.
Figure 2:
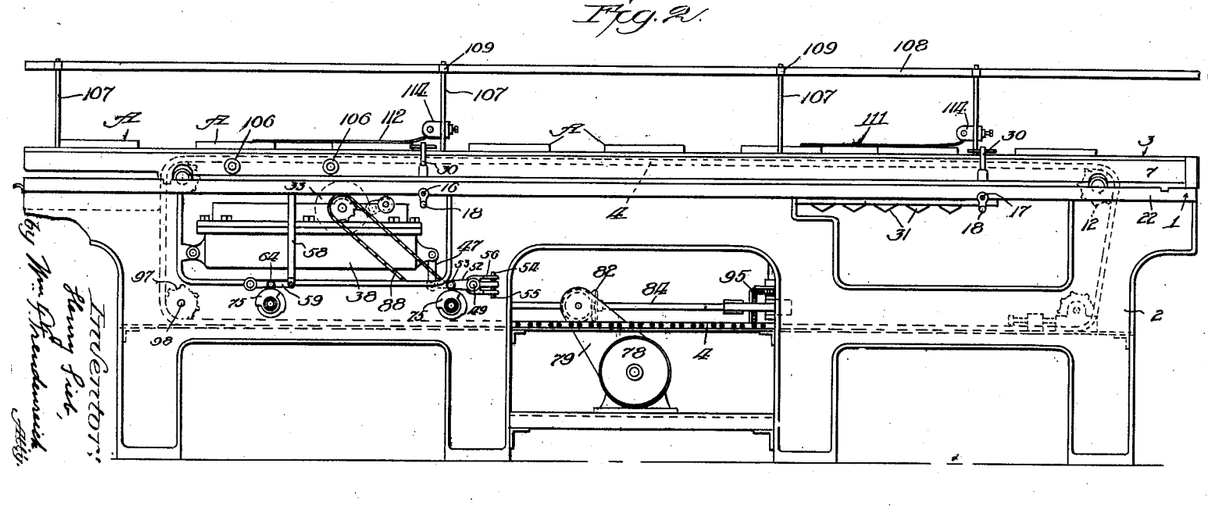
Fig. 2 is a side view of the machine.
Figure 15:
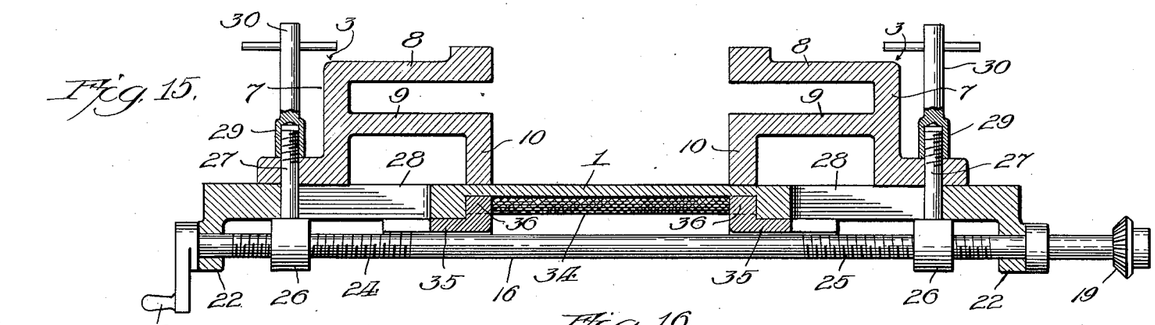
Fig. 15 is a section on line 15—15 of Fig. 3.

The guide rails may be adjusted from and toward each other by means of screw shafts of which two are shown at 16 and 17 in Figs. 1 and 2; each shaft being provided at one end with a handle 18 by means of which it may be turned; and at the opposite end with a bevel pinion 19 meshing with a complementary pinion 20 fixed to a shaft 21 extending longitudinally along the side of the machine. The arrangement will be best understood from an examination of Fig. 15. Here it will be seen that the shaft 16 extends underneath the table, from one side to the other, being journalled in depending flanges 22 at opposite sides of the table. The shaft has oppositely screw-threaded sections 24 and 25 toward its ends. On each screw threaded section is a nut 26. Each nut is provided with a stem 27 extending upwardly therefrom through a transverse slot 28 in the table and through the horizontal foot flange of the L-shaped portion 7 of the corresponding guide rail. The upper end of each of the stems 27 is screw-threaded, and there is a nut 29 screwed upon the same and engaged with the upper face of the foot flange of the guide rail. Each nut 29 has an upwardly projecting stem 30 provided with a suitable handle for turning the same. When the nuts 29 are tightened, they draw the nuts 26 up against the under surface of the table and press the foot flanges of the guide rails down on top of the table, locking the guide rails in place. When the nuts 26 are unscrewed then, by turning one of the handles 18 and thereby causing both of the shafts 16 and 17 to turn, the guide rails will be moved from or toward each other, depending upon the direction in which the handle is turned. It will be seen that the length of the slots 28 determines the range of adjustment of the guide rails from and toward each other; the guide rails being shown in Fig. 15, as well as in all of the other figures, as being at their farthest distance apart.

Figure 16:
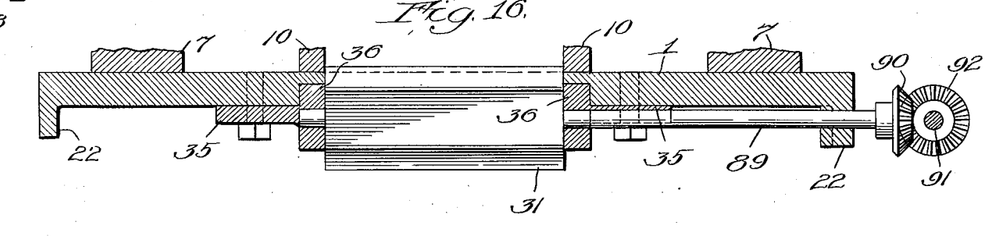
Fig. 16 is a section on line 16—16 of Fig. 9.

When the books are placed in the machine, they are still in a loose condition due to the fact that the leaves are held together simply by the stitching which, even though the leaves in each section may be held in proper relation to each other, permits the sections themselves to shift their positions relatively to each other by sliding upon each other. The purpose of gluing the back edges of the books is to prevent such shifting movements of the book sections. Therefore, since the back edge face should be flat and square with respect to the leaves, it is necessary that the relatively loose books be treated so as to make the back edges flat and cause the leaves to stand at right angles thereto, before the glue is applied. This I accomplish by jarring or jostling means acting on the books immediately after entering the machine. In the arrangement shown, and best seen in Figs. 9 and 16, the jostling means comprises five hexagonal rollers 31 having their corners rounded somewhat; these rollers underlying the table and being journalled at their ends in the flanges 22 at the sides of the table. The table has a slot 32 extending across the same in registration with each of these rollers; these slots permitting the corners or ridges of the rollers to project up through the table and slightly above the latter. These rollers are sufficiently small and sufficiently close together that a book, such as indicated at A in Fig. 9, may rest on several of them at one time. At any rate, assuming that these rollers are being rotated and that a group or bundle of books has been placed on the table and is being carried forward by one of the bars 6 on the drive chains, it will be seen that when the books reach the rollers, they will alternately be lifted off the table and then be allowed to drop again. In this way the books are effectively jarred and shaken so that by the time the books have passed beyond the jarring rollers, every section will make contact with the flat table throughout its entire length, so that the rear edges of the books are now flat and at right angles to the upstanding leaves.

After the books have been properly shaped by the jarring mechanism, glue is applied to their back edges. The amount of glue used should not be excessive, and yet it must be carried up into the crevices between the rounded edges of adjacent book sections. In order to apply the proper amount of glue, I employ a roller dipping into the supply of glue and adapted to contact with the back edges of the books as they pass above the same. At a later point in their travels, the books are acted upon from underneath by brushes which redistribute the glue and work it up into the crevices without, however, forcing it too far in between sections.

The glue cannot be applied through the solid table and it is for this reason that the central longitudinal panel is cut out of the front end which is the lefthand end in Fig. 6. Extending across this open space in the table are numerous rollers 34 which constitute the actual supporting surface for the books as they enter and after they leave the gluing zone. The details of this particular part of the machine are best shown in Figs. 5, 6, 10 and 17 to 19. For convenience in manufacture, the rollers are not mounted directly upon the table but upon supporting plates 35 underlying and secured to the table beside the open space in the same. Each of the plates 35 has a narrow upstanding flange 36 along the edge within the open space in the table. Notches 37 are cut into these flanges from the top; these notches being of a depth substantially equal to the diameter of the rollers. The rollers are simply dropped down into these notches and may be removed by lifting them out. All of the rollers are knurled on their peripheries.

The roller 34 nearest the unmutilated part of the table is spaced apart a considerable distance from the latter, as best shown in Fig. 10, thereby permitting a large glue-applying roller 33 to extend up through the open space between this first roller and the adjacent transverse edge of the central portion of the table. The glue roller extends down into a large pan 38 that contains glue, and has associated therewith a small roller 39 that acts to scrape excess glue from the glue-applying roller. As will hereinafter be explained, the roller 33 is rotated when the machine is in operation, so as continuously to present new surfaces to books that pass over the same. A short distance beyond the glue applying roller is placed a brush whose bristles 40 extend up between two of the rollers 34 far enough to permit them to brush the overlying book edges as the books travel across the same, and spread out the glue and carry it up into the crevices between individual sections. After the chains have carried a bunch of books beyond the glue pot, the chains start downwardly. A nest of the rollers 34 lie forwardly beyond the downwardly extending runs of the chains so that as the advance ends of the books pass the vertical plane of the downward rungs of the chains, they begin to ride upon this final group of supporting rollers; being pushed ahead across these rollers until the cross bar on the drive chains that has been pushing the books ahead reaches its farthest forward position and is ready to disappear under the table.

The glue pot or pan 38 has a false bottom which provides a chamber 41 within which there are suitable heating elements 42 which raise the temperature of any desired fluid in this chamber and thus cause the glue pot proper to be heated through contact with such fluid. Underneath the final group of rollers 34, which may be said to form the unloading platform, there is a water pan 44 containing a suitable heating device 45. The water in the pan 44 is thus heated and caused to vaporize, the vapor heating the overlying rollers 34. I have found that in actual practice the rollers above the pan 44 remain clean when subjected to this atmosphere of hot water vapor, so that the back edges of books coming to rest upon the same are not in danger of being dirtied from an accumulation of glue on the supporting rollers.

Figure 3:
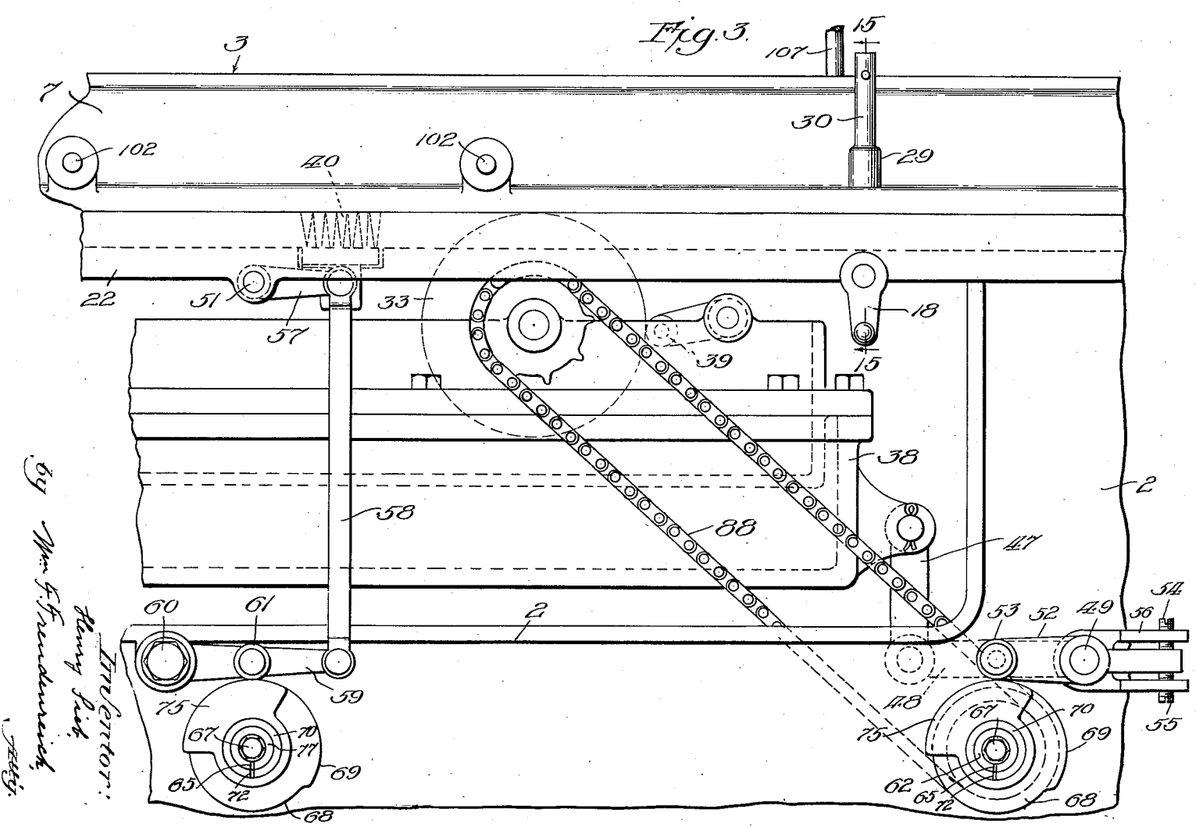
Fig. 3 is a side view, on a larger scale, showing only a portion of the machine in the region occupied by the glue applying devices.
Figure 4:
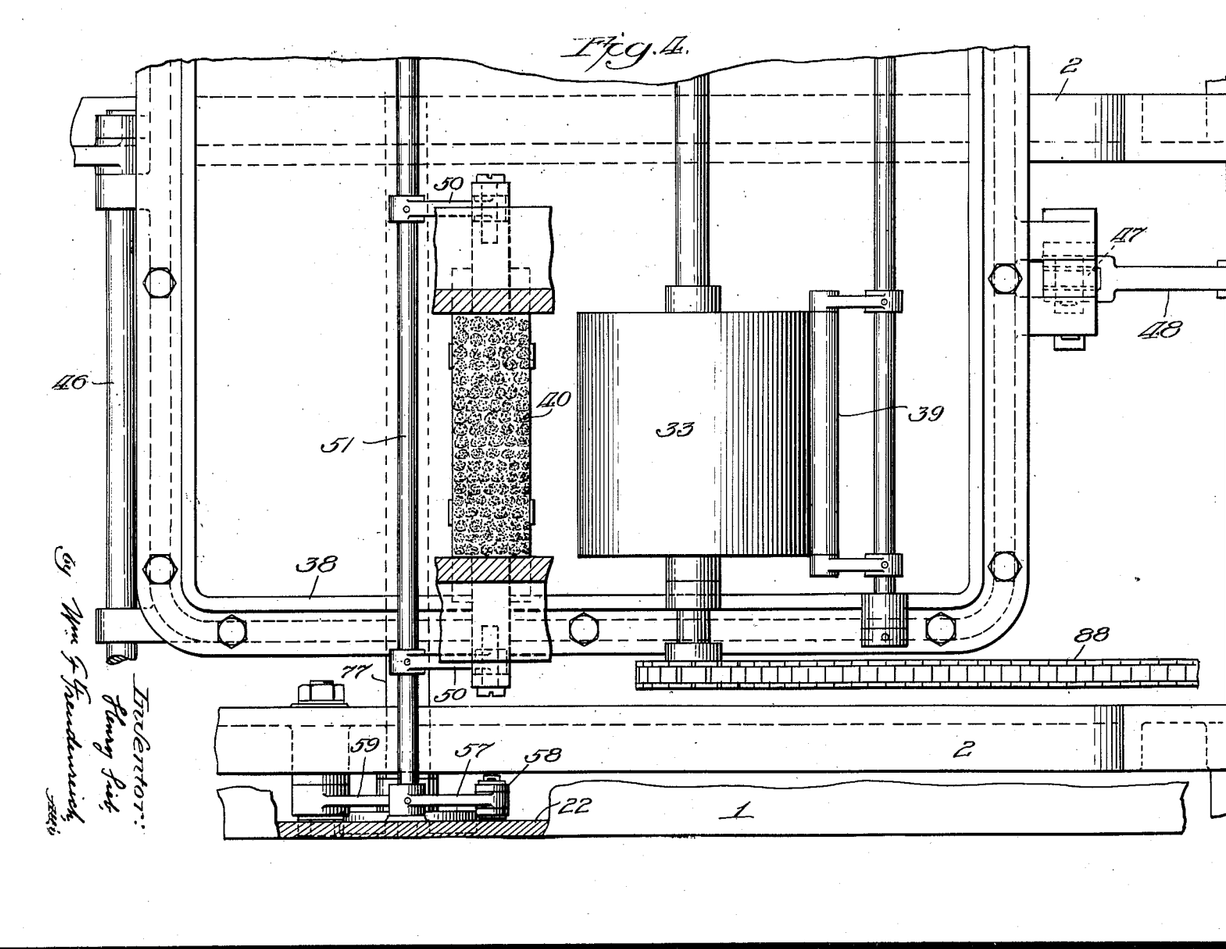
Fig. 4 is a top plan view of about that portion of the machine shown in Fig. 3, with the major portion of the structure above the glue pot being omitted.
Figure 5:
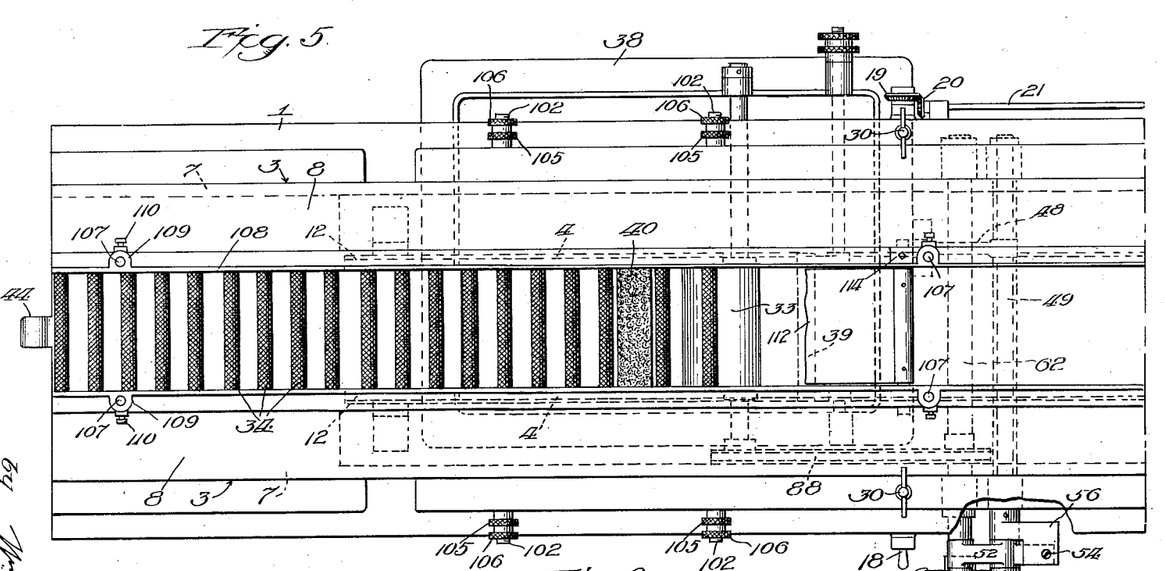
Fig. 5 is a top plan view of the lefthand half of the machine, corresponding to the lefthand half of Fig. 1, but on a larger scale.

Sometimes glue is applied to the back edges of books before the leaves are trimmed while, at other times, the leaves are first trimmed and then the glue is applied. It is evident that when the leaves are first trimmed, care must be taken not to soil the end faces of the books, which might happen if a glue roller or brush came in contact with the books in such a way as either to touch the end faces or cause glue to be pushed up on the same. I have therefore provided means for controlling the glue-applying and distributing means in a manner to prevent the possibility of glue from reaching the end faces of the books and thus damaging them if the leaves have already been trimmed. The particular way in which I accomplish this is to raise and lower the glue pot and the brush in definite time relation to the movements of the cross bars in the chain feed. In the arrangement shown, as best seen in Fig. 10, the glue pot is supported at the forward end by a hinge pin 46 and at its other end by a vertical strut 47 pinned at its lower end to the free end of a radial arm 48 on a transverse rock shaft 49. The brush 40 is carried on the free end of a radial arm 50 projecting from a transverse rock shaft 51 journalled at its end in the flanges 22 of the table. The rock shaft 49 is mounted in the supporting frame below the table and, on the outside of this frame, as best shown in Fig. 3, has thereon a member 52 which projects radially therefrom in opposite directions and is free to turn on the shaft. One free end of the member 52 has thereon a roller 53 adapted to rest upon a rotatable cam device, while the other end lies between the inner ends of two set screws 54 and 55 carried in the arms of a fork 56 that projects radially from and is fixed to the shaft. When the support underneath the roller 53 is removed, the weight of the glue pot causes the rear end of the same to drop down and the shaft 49 to turn. Likewise, by raising the roller 53, the movable end of the glue pot also rises and the shaft 49 turns. Where the support for the roller 53 is a cam device, which alternately raises the roller and permits it to drop down, the glue applying roller 33 will be intermittently moved upwardly in position to engage books that may overlie the same. By loosening one of the screws 54 and 55, and screwing the other farther in, the member 52 is moved angularly somewhat with respect to the shaft 49 but, as long as the support for the roller 53 remains stationary, the roller does not move up or down, and therefore the shaft 49 must turn relatively to the member 52 and cause a slight upward or downward movement of the adjacent end of the glue pot. In other words, the means just described permits a slight adjustment of the glue applying roller in the vertical direction, regardless of whether or not the cam device be a mere stationary support for the roller 53 or something that causes the glue pot to move up and down.

The shaft 51 shaft 51 that serves to support the brush 40 projects out through the flange 22 on the same side of the machine as that on which the double arm 52 lies and, on the inner side of this flange 22, it is provided with a radial arm 57 the free end of which is connected to a vertical rod or strut 58, the lower end of which is pinned to one end of a rocker arm 59, whose other end is rotatably connected by a pin 60 to the frame structure 2. Between the ends of the rocker arm 59 is mounted a roller 61 which rests on a cam device similar to that cooperating with the roller 53.

The two similar cam devices just described are illustrated in detail in Figs. 25 to 30. Referring to these figures, 62 represents a shaft having in the end a frusto-conical recess 64, and there being a slot 65 extending through the wall bounding the recess. A screw 66 having a frusto-conical head 67 is screwed into the shaft coaxial with the recess 64; the head of the screw serving as an expander for the split wall surrounding the recess. Surrounding the end of the shaft is a cam disk 68, a portion 69 of which is of larger radius than the rest. The disk 68 has hub sleeves 70 and 71 on opposite sides thereof, the sleeve on the outer side being split, as indicated at 72, while the other hub sleeve is fastened to the shaft against rotation by a key 74. When the screw 66 is tightened, the divided end of the shaft is expanded into the hub sleeve 70 and holds the cam disk 68 against slipping off the end of the shaft. Either of the two segmental cam disks 75 and 76, shown in Figs. 28 and 29, respectively, may be slipped on the hub sleeve 70 and be locked thereto by the expansion of that sleeve through the tightening of the screw 66. The members 75 and 76 are alike except that the angular length of the working edge of the member 76 is much greater than the corresponding dimension of the member 75; the radius of each being the same as that of the cam portion 69 of the disk 68. The cam rollers 54 and 61 rest on the peripheral edges of the disks of their respective devices.

Figure 30:
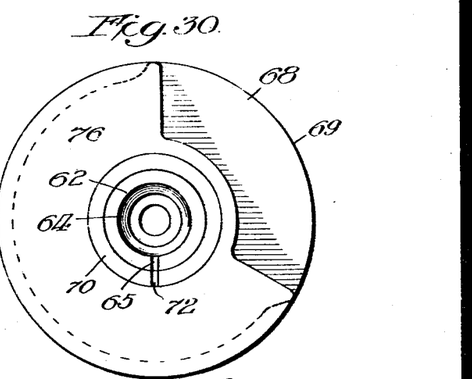
Fig. 30 is a view similar to Fig. 28, showing the assembly as containing the cam disc of Fig. 29 instead of that illustrated in Fig. 28.

When it is desired that the rollers shall be supported in raised positions while their cam devices are turning through an angle exactly equal to the angular length of the cam 69, only the cam disk 68 need be employed in each. For a somewhat longer period, the cam disk 75 may be added, affording a maximum angular length of cam somewhat greater than one hundred eighty degrees. For a still longer lifting period, the cam member 76 may be substituted for the member 75, permitting the angular length of the cam face to be increased, until the cam ultimately becomes, in effect, a complete disk, as shown in Fig. 30.

The shaft 62 is supported below the roller 53, slightly forward of and parallel to the shaft 49, while a similar shaft 77 extends transversely of the machine below the roller 61; the shaft 77 having thereon the same cam device as that just described as being associated with the shaft 62.

Figure 23:
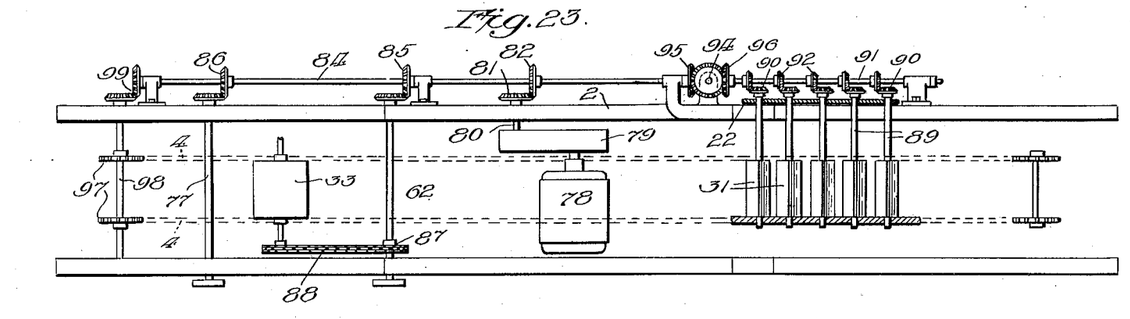
Fig. 23 is a more or less diagrammatic view of the machine illustrating the drive mechanism.
Figure 24:
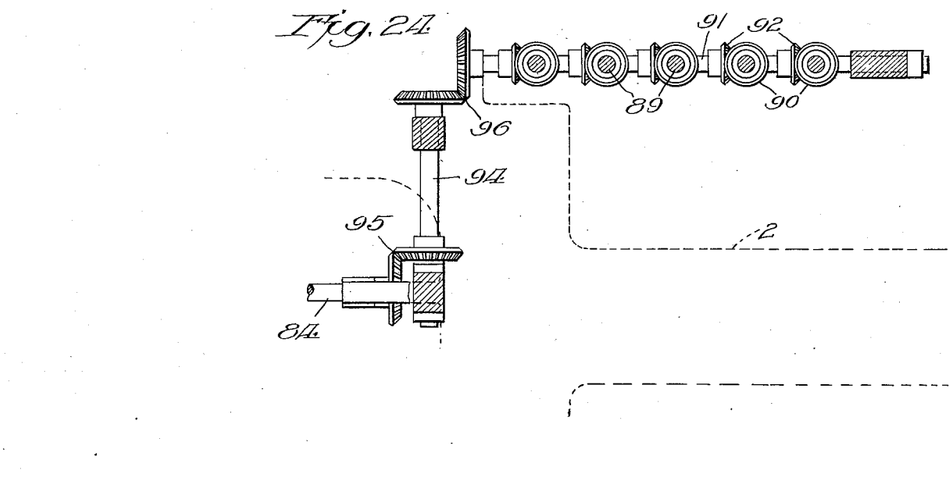
Fig. 24 is a section on line 24—24 of Fig. 1, on a somewhat larger scale, illustrating the immediate driving means for the rotary agitators.
Figure 25:
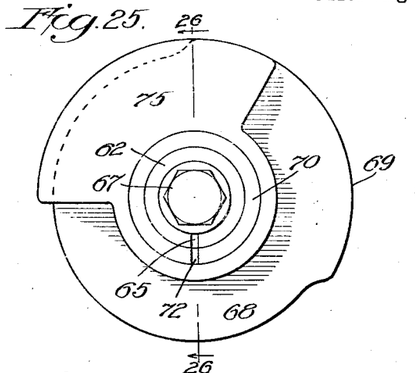
Fig. 25 is an end view of one of the adjustable cam devices for causing the glue pot and the glue distributing brush to rise and fall.
Figure 26:
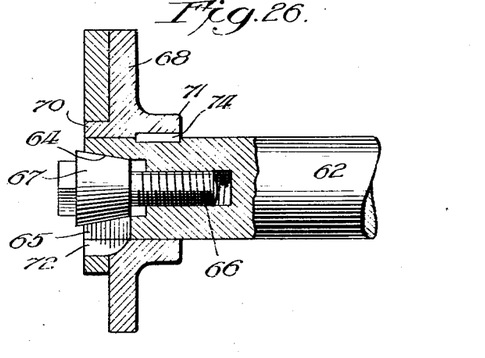
Fig. 26 is a section on line 26—26 of Fig. 25.
Figure 27:
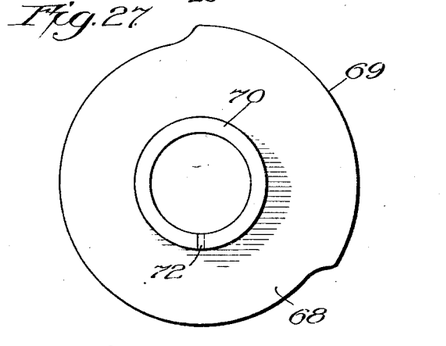
Fig. 27 is an elevation of the cam disk that appears in the rear in Fig. 25 and on the right in Fig. 26.
Figure 28:
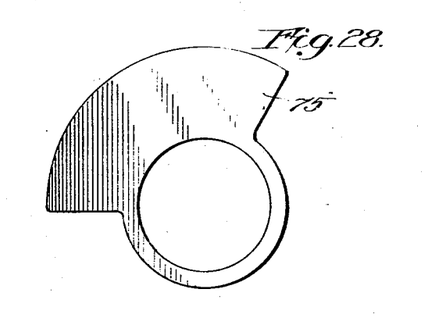
Fig. 28 is an elevational view of the other of the two cam discs appearing in Figs. 25 and 26.
Figure 29:
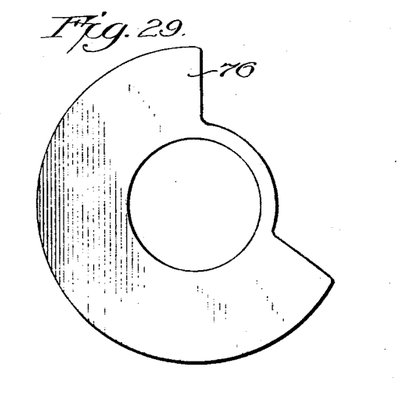
Fig. 29 is a view similar to Fig. 28, showing a third cam disc.

Any suitable drive means may be provided to operate the moving parts. In Figs. 23 and 24 there is illustrated an arrangement for driving all such parts from a single motor. Referring to these figures, 78 represents an electric motor with which is associated a speed-reducing gear device 79. A horizontal shaft 80 extends from the speed reducing device through one side of the frame of the machine and has on the outer end a bevel gear 81. The gear 81 meshes with a complementary gear 82 on a shaft 84 extending lengthwise of the machine. The cam shafts 62 and 77 are driven from the shaft 84 through pairs of bevel gears indicated at 85 and 86. On the shaft 62 is a sprocket wheel 87 engaged by a sprocket chain which drives the glue roller 33. The jarring rollers 31 are also driven from the shaft 84, but not directly. Each of these rollers is mounted on a shaft 89 which extends laterally through the flange 22 on the side of the table on which the shaft 84 lies, and has on its outer end a bevel gear 90. A longitudinal shaft 91 extends along the machine past the bevel gears 90 and has thereon gear wheels 92 that mesh with the latter. The shaft 91 is driven from the shaft 84, through a vertical shaft 94 driven at its lower end from the shaft 84 through bevel gears 95 and, in turn, driving the shaft 91 through bevel gears 96. The sprocket chains 4 are also driven by the shaft 84. As shown in Fig. 10, the sprocket chains extend down at the front end of the machine part and then underneath sprocket wheels 97 on a transverse shaft 98. The shaft 98 is driven from the shaft 84 through gear wheels 99.

The shaft 98 must of course be driven in a direction to cause the upper runs of the book-moving sprocket chains to move from right to left in Fig. 23. Therefore, the shaft 98 must run clockwise, as viewed from the end next to the shaft 86. Thus the shaft 84 must turn in the counter-clockwise direction, as viewed from the front end of the machine. The cam shafts 62 and 77, and the glue roller 33, turn in the same direction as the shaft 98. The top of the glue roller accordingly moves in the same direction as the books passing over the same, but at a higher peripheral speed than the forward speed of the books, due to the fact that the glue roller, as shown, is larger in diameter than the sprocket wheels 97 although rotating at the same angular speed. However, by tracing the gear trains from the shaft 84 to the shafts 89 of the book jarring rollers 31, it will be seen that these rollers turn in the opposite direction from the glue roller, namely in a direction tending to move the books backward. By this means the books are pushed back against the cross bars that are driving them ahead and thus insure that the book sections will not be displaced relatively to each other in the longitudinal direction. In other words, the books are squared across their rear ends as well as across their back edges.

Figure 8:
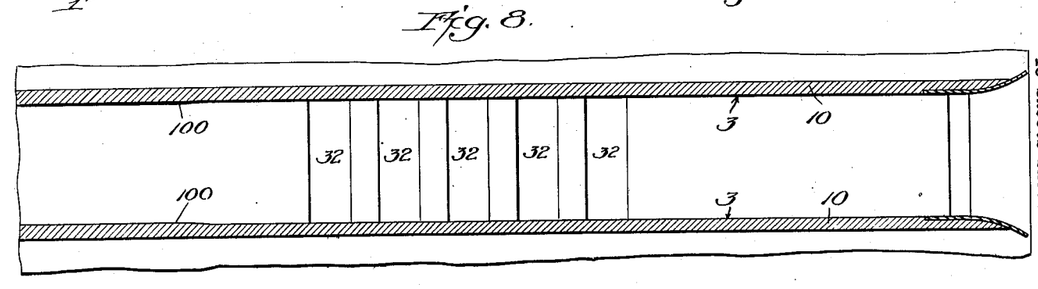
Fig. 8 is a plan view showing that part of the table appearing in Fig. 7, with the guides shown in section, and the rollers for agitating or jostling the books omitted.
Figure 12:
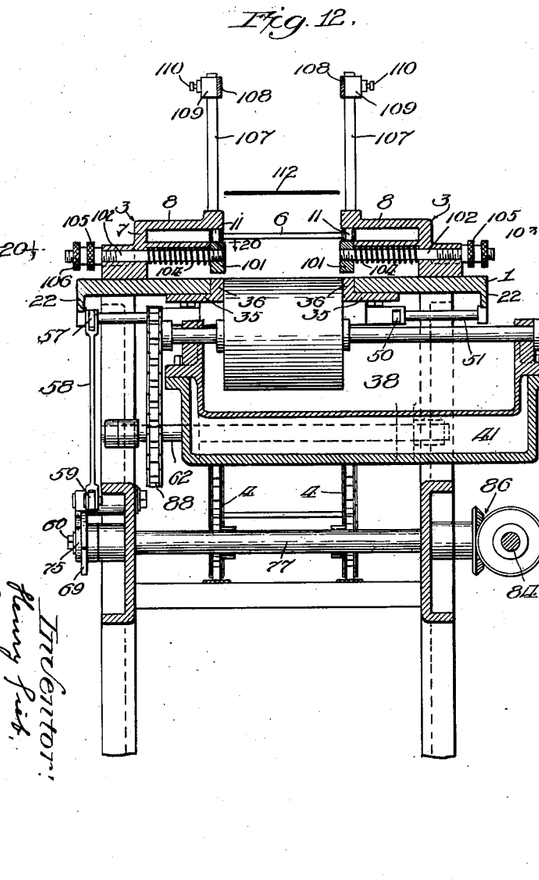
Figure 13:
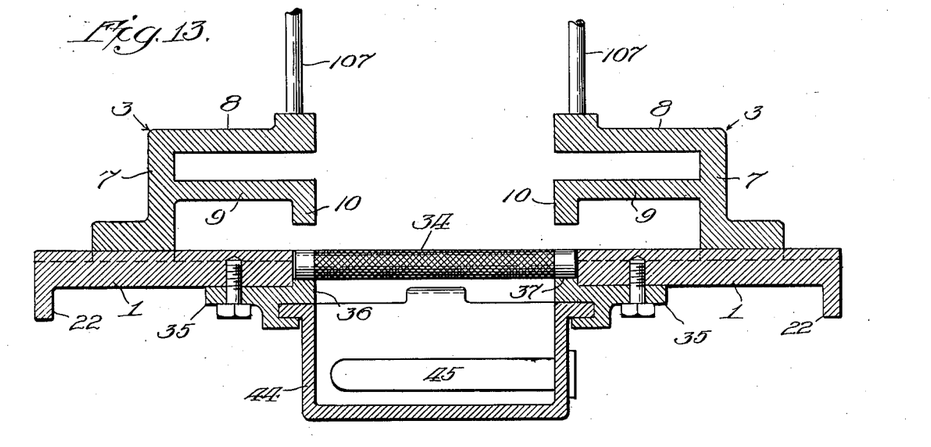
Fig. 13 is a section on line 13—13 of Fig. 10, but on a larger scale.
Figure 14:
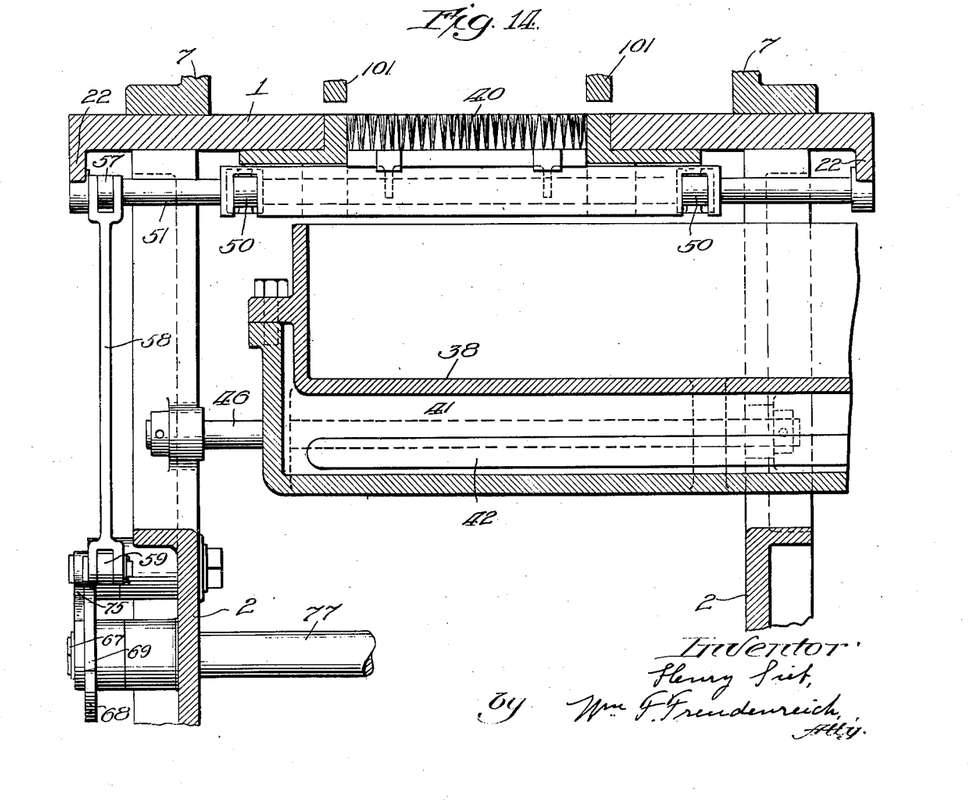
Fig. 14 is a section on line 14—14 of Fig. 10, showing only a fragment of the machine, and the scale being the same as that of Fig. 13.

The books should be rather loosely held between the guides while they are being shaken or jarred into shape, and should be more firmly held while the glue is being applied and distributed. As will be seen in Fig. 8, the vertical book-engaging flanges 10 of the guides 3 are thickened outwardly on the sides facing each other, as indicated at 100, from a point a little forward of the slots 32 through which the jarring rollers project above the table. Consequently, as the books pass beyond the jarring rollers they enter a narrower passage and are squeezed. Just before the books reach the glue-applying zone, further clamping pressure is applied to squeeze the book sections together and prevent the glue from penetrating too far between them. As will be seen by reference to Figs. 10, 12 and 20, the flanges 10 on the guides are cut away above the glue pot and, in the spaces so obtained, there are placed long plates or bars 101. Each of these bars is fixed on the inner ends of two rods 102 extending through and slidably supported in the parts 7 of the guide rails. Surrounding each of these rods is a compression spring 104 which bears at one end against the corresponding plate or bar 101 and at its other end against the vertical flange of the part 7 of the corresponding guide rail. The outer end of each rod is screw-threaded and has thereon a nut 105 with which may be associated a lock nut 106. The springs always push the pressure plates out into the book-receiving channel as far as the nuts 105 will permit. By adjusting the nuts the degree of pressure best suited to the particular books being operated upon at any given time may be obtained.

Figures 20, 21, 22:
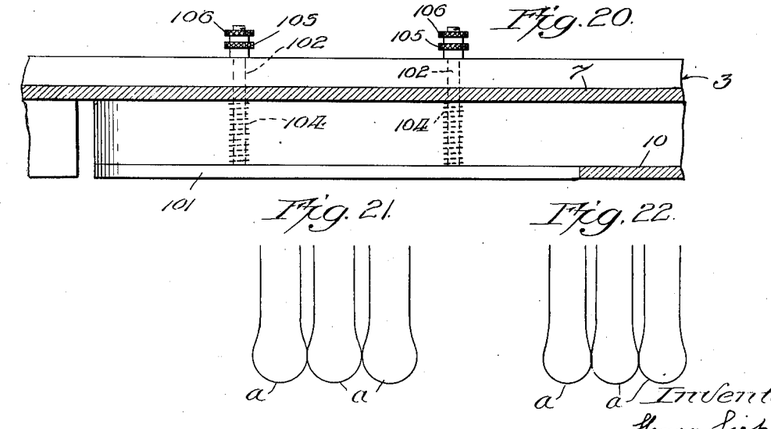
Fig. 20 is a section on line 20—20 of Fig. 12.
Figs. 21 and 22 are diagrams illustrating respectively a group of book sections after they have been shaken into proper shape, before and after being compressed preparatory to applying glue.

In Fig. 21 I have illustrated diagrammatically a few book sections as they appear after being jarred into their proper positions in a book, and in Fig. 22 the same sections squeezed together during gluing.

In order to accommodate wide books, the guide rails may be provided with upward extensions of any desired height. In the arrangement shown, each guide rail has a series of rods or slender posts 107 rising therefrom and distributed lengthwise thereof. Extending longitudinally of the machine are bars 108 each provided on one side with projecting bosses 109 through which the members 107 of one of the guide rails pass. The bars may be fixed in place on the posts at any desired elevation, by means of set screws 110 extending into the bosses. These two bars or auxiliary guide rails may be adjusted to engage the books toward their upper edges or at any desired distance below such edges while the books are travelling through the machine.

It may be advisable, at times, to have means for holding the books down, particularly while receiving an application of glue, and also to insure that they will drop back after being lifted by the jarring rollers. This may conveniently be accomplished by providing spring fingers or spring plates such as illustrated at 111 and 112 in Figs. 1 and 2 and also in Figs. 9 and 10. These pressure members may be long enough to extend completely over the jarring zone and for the full length of the glue applying zone, and they may be supported on suitable brackets 114 mounted on the posts or rods 107 and adjustable up and down upon the latter.

When a lot of sewn books are to have their back edges glued, the guide rails of the machine are adjusted from or toward each other so as to accommodate between them the desired number of books, and the pressure plates or fingers 111 and 112 are adjusted to the proper height. In the case of wide books, requiring the presence of the auxiliary guide rails 108, these rails are also adjusted up or down on their supporting posts. In the latter case the pressure devices 111 and 112 may be left off, or they may be removed and then be applied to their supporting posts or rods above the auxiliary guides. The nuts 105 controlling the positions of the yieldable plates 101 for producing side pressure on the books are adjusted to provide the desired pressure and, the glue pot having been filled with glue and the heaters for the glue pot and the water pan under the unloading platform having been energized, the machine is ready to receive books. Assuming that the books have previously been trimmed so that their end edges or faces must not be marred, the controlling means for the glue pot and the distributing brush must be adjusted. I have found that if the glue roller touches an overlying book or group of books, after the advance end of the latter has travelled about an eighth of an inch past the center of the roller, all danger of smearing the front vertical face of the advancing book or group of books is avoided. This is also the case with respect to the trailing vertical face of a book or group of books, if the glue roller is lowered when the center of the roller is still about one-eighth of an inch away from the trailing edge of the book or books. Therefore, the cam device for controlling the glue pot is so adjusted that the roller does not come in contact with the under edges of advancing books until the front edges of the books have passed the required distance beyond the center of the roller. Since the books are propelled through engagement with the cross bars on the endless sprocket chains, the points in the travel of these chains, at which the glue roller should be lowered, is always the same, and therefore the cam disk 68 is originally so set that the trailing edge of the cam portion 69 drops away from the roller 53 whenever a cross bar between the upper runs of the driving chains is still about one-eighth of an inch short of reaching the vertical plane containing the axis of the glue-applying roller.

What is true of the glue-applying roller is also true with respect to the distributing brush 40; so that the cam device for the brush is adjusted in the same way as that for the glue-applying roller, causing the brush to remain out of contact with a book or group of books until the front vertical face of the same shall have passed slightly beyond the front end of the brush, and to drop into an idle position just before the trailing end of the book or books reaches the rear end of the brush.

The books being fed into the inlet end of the machine are first jarred or shaken so as to flatten the underfaces which are the back edges of the books, and square the end faces by causing the books to be pressed against the cross bars that drive the books ahead. During all of the time that the cross bars are acting on the books, the cross bars are held against any up or down movements because the rollers on the sprocket chains are of approximately the same diameters as the distance between the flanges 8 and 9 of the main guide rails, between which the chains lie. After a book or group of books has been jarred into shape, while loosely held between the guide rails, it enters that part of the panel between the guide rails that is narrower than the inlet end, and the books are then more tightly held. Just before the books reach the glue roller they pass between the yielding pressure plates 101 which exert a substantial clamping pressure close to the edges to which the glue is to be applied, and thus the books' sections are pressed together tightly enough to prevent glue from penetrating upwardly beyond the first lines of contact between adjacent sections. The glue roller applies a thin coating of glue to the overlying book surfaces which are not plane surfaces, but are corrugated, with alternating ridges and valleys running lengthwise of the machine. The brush is adjusted so that when it is raised, it sweeps the glue upwardly into the valleys in the overlying book surfaces, and causes the glue to be evenly spread. I have found that by employing knurled rollers for supporting the books while and after applying the glue, no damage results to the glue coatings, either through scraping off of glue that should remain in place or through collecting surplus glue that one would expect to accumulate on any support over which glued surfaces are pushed.

The final step consists in the discharge of the books upon the unloading platform, comprising the final group of knurled rollers over the heated water pan at the front or discharge end of the machine.

When I refer to sewn books, I mean not only groups of plain sections, but also books in which the outermost sections have on their outer sides attached covers of the "self", "guarded" and "tip" types.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A machine for applying glue to the back edges of books, comprising a support on which the books may stand upright on their back edges, means to move the books across said support, means to apply glue to the under edges of the books when the books reach a predetermined position on said support, means to jar the books and cause the leaves thereof to settle themselves properly, and guide means for the books holding them loosely while being jarred and compressing them somewhat adjacent to their rear edges while the glue is being applied.

2. A machine for applying glue to the back edges of books, comprising a support on which the books may stand upright on their back edges, means to move the books across said support, means to apply glue to the under edges of the books when the books reach a predetermined position on said support, means to work the glue into the crevices in the backs of the books, means to jar the books and cause the leaves thereof to settle themselves properly, and guide means for the books holding them loosely while being jarred and compressing them somewhat adjacent to their rear edges while the glue is being applied and worked into the crevices.

3. A machine for applying glue to the back edges of books, comprising a support on which the books may stand upright on their back edges, means to move the books across said support, means to apply glue to the under edges of the books when the books reach a predetermined position on said support, means to jar the books and cause the leaves thereof to settle themselves properly, and guides for the books adjustable from and toward each other to receive book assemblies of various thicknesses to hold them loosely upright while being jarred and to compress them somewhat adjacent to their back edges while the glue is being applied.

4. A machine for applying glue to the back edges of books, comprising a support on which the books may stand upright on their back edges, means to move the books across said support, means to apply glue to the under edges of the books when the books reach a predetermined position on said support, rollers arranged underneath and projecting above the support to jar the books and cause the leaves thereof to settle themselves properly, and guide means for the books holding them loosely while being jarred and compressing them somewhat adjacent to their rear edges while the glue is being applied.

5. A machine for applying glue to the back edges of books, comprising a support in the form of a horizontal table and a series of spaced, parallel, horizontal rollers beyond an end of the table, guides arranged above said support and at right angles to said rollers to hold upright books standing between them on their back edges, means to move such books over the table and the rollers, and means underneath said support to apply glue to and work it into the crevices in the under edges of books moving across the rollers.

6. A machine for applying glue to the back edges of books, comprising a support in the form of a horizontal table and a series of spaced, parallel, horizontal rollers beyond an end of the table, guides arranged above said support and at right angles to said rollers to hold upright books standing between them on their back edges, means to move such books over the table and the rollers, means underneath said support to apply glue to the under edges of books moving across the support, and brush means under the support to engage with the under edges of the books after the glue has been applied thereto and while they are resting on said rollers.

7. A machine for applying glue to the back edges of books, comprising a support in the form of a horizontal table and a series of spaced, parallel, horizontal rollers beyond an end of the table, said rollers having knurled peripheries, guides arranged above said support and at right angles to said rollers to hold upright books standing between them on their back edges, means to move such books over the table and the rollers, and means underneath said support to apply glue to the under edges of books moving across the rollers.

8. A machine for applying glue to the back edges of books, comprising a support in the form of a horizontal table and a series of spaced, parallel, horizontal rollers beyond an end of the table, guides arranged above said support and at right angles to said rollers to hold upright books standing between them on their back edges, means to move such books over the table and the rollers, means underneath said support to apply glue to and into the crevices in the under edges of books moving across the rollers near the table, and means to produce an atmosphere of warm water vapor around the book-supporting rollers toward the discharge end of the machine.

9. A machine for applying glue to the back edges of books, comprising a support on which the books may stand upright on their back edges, endless chains having portions extending in parallel relation to each other across said support and adapted to receive the books between them, cross bars connecting said chains together and adapted to engage the books and move them ahead, means to apply glue to the under edges of the books when the books reach a predetermined position on said support, means to jar the books and cause the leaves thereof to settle themselves properly, and guide means for the books.

10. A machine for applying glue to the back edges of books, comprising a support on which the books may stand upright on their back edges, means to move the books across said support, means to apply glue to the under edges of the books when the books reach a predetermined position on said support, means to work the glue into the crevices in the backs of the books, means to jar the books and cause the leaves thereof to settle themselves properly, and longitudinal guides forming with the support a channel for the books; said channel being narrower in the vicinity of the glue-applying means than in the region where the books are jarred, whereby the books are held loosely while being jarred and are compressed somewhat while the glue is being applied and worked into the crevices.

11. A machine for applying glue to the back edges of books, comprising a support on which the books may stand upright on their back edges, means to move the books across said support, means to apply glue to the under edges of the books when the books reach a predetermined position on said support, means to jar the books and cause the leaves thereof to settle themselves properly, and guides for the books adjustable from and toward each other to receive between them book assemblies of various thicknesses moved over the support, and means to exert a yielding downward pressure on the books while the books are being jarred and while the glue is being applied.

12. A machine for applying glue to the back edges of books, comprising a horizontal support on which the books may stand upright on their back edges, means including horizontal bars to engage with the rear edges of the books to move the books across said support, means to apply glue to the under edges of the books when the books reach a predetermined position on said support, rotary rollers arranged underneath and each projecting variable distance above the support during each revolution thereof, and means to rotate said rollers in a direction tending to move the books backward, thereby to jar the books and cause them to flatten their back edges against said support and their trailing end edges against the bars that move them ahead, and guide means for the books.

13. A machine for applying glue to the back edges of books, comprising a support on which the books may stand upright on their back edges, means to move the books across said support, means to apply glue to the under edges of the books when the books reach a predetermined position on said support, rollers polygonal in cross section underlying the support and projecting up through the same in the path of the books, means to rotate said rollers to jar the books and cause the leaves thereof to settle themselves properly, and means to guide the books while being jarred and while the glue is being applied.

14. A machine for applying glue to the back edges of books, comprising a support in the form of a flat horizontal table and a series of spaced, parallel, horizontal rollers beyond an end of the table, guides arranged above said support and at right angles to said rollers to hold upright books standing between them on their back edges, means to move such books over the table and the rollers, means to jar the books and flatten their back edges while on the table, and means underneath the rollers and extending up between them to apply glue to the back edges of the books and work it into the crevices in the under edges of books moving across the rollers.

15. A machine for applying glue to the back edges of books, comprising a support in the form of a horizontal table and a series of spaced, parallel, horizontal rollers beyond an end of the table, guides arranged above said support and at right angles to said rollers to hold upright books standing between them on their back edges, means to move such books over the table and the rollers, means underneath said support to apply glue to the under edges of books moving across the support, brush means under the support to engage with the under edges of the books after the glue has been applied thereto and while they are resting on said rollers, and means to move the glue-applying means and the brush means into and out of operative positions in predetermined time relation to the means for moving the books over the support.

16. A machine for applying glue to the back edges of books, comprising a support in the form of a horizontal table and a series of spaced, parallel, horizontal rollers beyond an end of the table, parallel guides arranged above said support and at right angles to said rollers to hold upright books standing between them on their back edges, endless chains each having one of its runs resting on and movable lengthwise of one of said guides, cross bars connecting said chains to engage with and move such books over the table and the rollers, and means underneath said support to apply glue to the under edges of books moving across the rollers.

17. A machine for applying glue to the back edges of books, comprising a support in the form of a horizontal table and a series of spaced, parallel, horizontal rollers beyond an end of the table, parallel guides arranged above said support and at right angles to said rollers to hold upright books standing between them on their back edges, said guides having horizontal channels extending deeply into the same on the sides toward each other and at a substantial distance above said support, means to adjust the guides from and toward each other, two endless sprocket chains each of which has a run extending lengthwise of one of the guides through the channel thereon, cross bars connecting the chains together, means to drive the said chains to cause the cross bars to move books over the table and the rollers, and means underneath said support to apply glue to and into the crevices in the under edges of books moving across the rollers near the table.

HENRY SIEB.